Sept. 24, 1940.  A. J. STONE  2,215,486
REFRIGERATING APPARATUS
Filed Dec. 17, 1937    3 Sheets-Sheet 2

Inventor:
Andrew Jackson Stone
By Brown, Jackson, Boettcher & Dienner
Attys.

Sept. 24, 1940.     A. J. STONE     2,215,486
REFRIGERATING APPARATUS
Filed Dec. 17, 1937     3 Sheets-Sheet 3
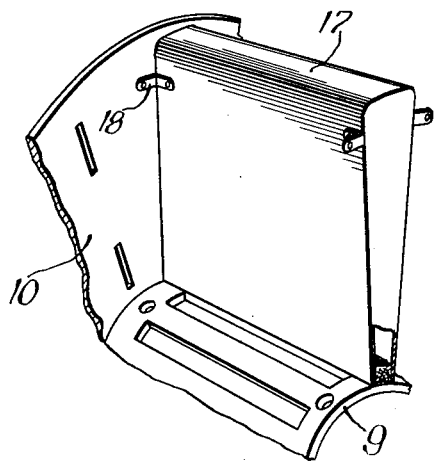
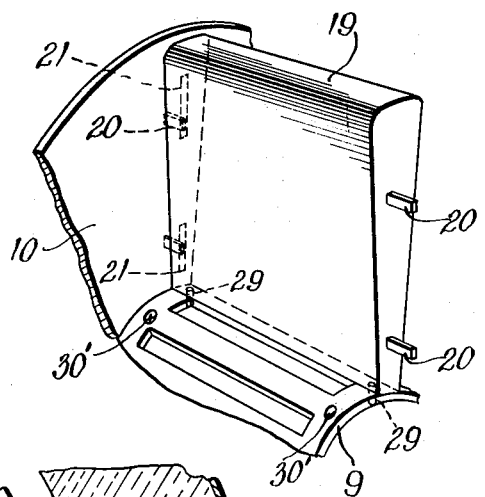
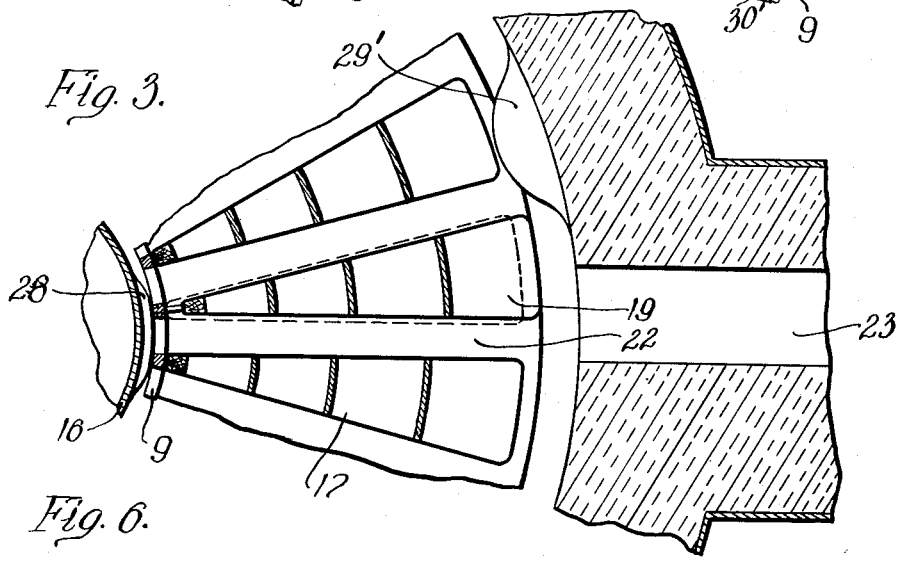
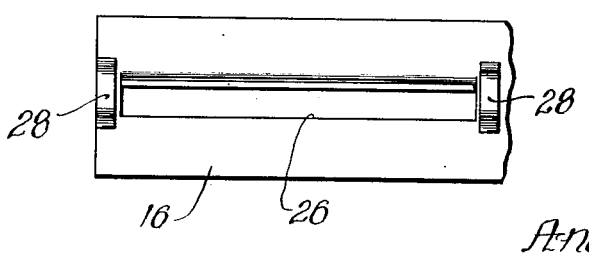
Inventor:
Andrew Jackson Stone
By Brown, Jackson, Boettcher & Dienner
Attys Patented Sept. 24, 1940

2,215,486

UNITED STATES PATENT OFFICE 2,215,486

REFRIGERATING APPARATUS

Andrew Jackson Stone, London, England, assignor of one-half to Robert L. Hague, New York, N. Y.; City Bank Farmers Trust Company and Walter E. Godfrey, executors for Robert L. Hague, deceased Application December 17, 1937, Serial No. 180,267

15 Claims. (Cl. 62—114)

My invention relates to a refrigerating apparatus and method, particularly for what is generally known as quick freezing, and contemplates certain improvements over the subject matter of my copending patent application, Serial No. 178,840, filed December 9, 1937.

My invention is concerned with the quick freezing of fresh fruits, vegetables, meats, fish and fowl, whole or in prepared form, and packaged or unpackaged, wrapped or unwrapped, the units to be frozen, in a machine of given measurements, being of more or less uniform size and shape, i. e., within certain ranges of dimensions. I refer herein to the same, whatever they may be, as "articles" to be frozen.

The apparatus comprises broadly a thermally insulated housing having in it a rotatable drum providing freezer compartments between refrigerant chambers, the arrangement being such that the articles are introduced into the freezer compartments successively as such compartments reach a given position in the rotation of the drum, remain there long enough to be frozen, and are removed, frozen, as such compartments reach a given position in the rotation of the drum, preferably the same position at which they were introduced. Thus, I contemplate continuous operation, i. e., unfrozen articles are introduced and frozen articles are removed, successively, while others are being frozen.

The instant invention lies in certain features which will be made point of as this description proceeds and which will be set forth in the appended claims.

In the accompanying drawings,

Figure 3 is a fragmentary view, similar to a portion of Figure 2, but on a larger scale;

Figures 4, 5, and 6 are details which will be referred to; and

Figure 7:
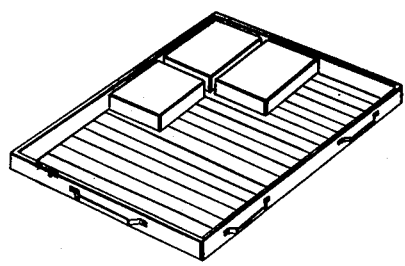

Figure 7 is a perspective view showing one of the trays for carrying articles to be frozen.

Figure 1:
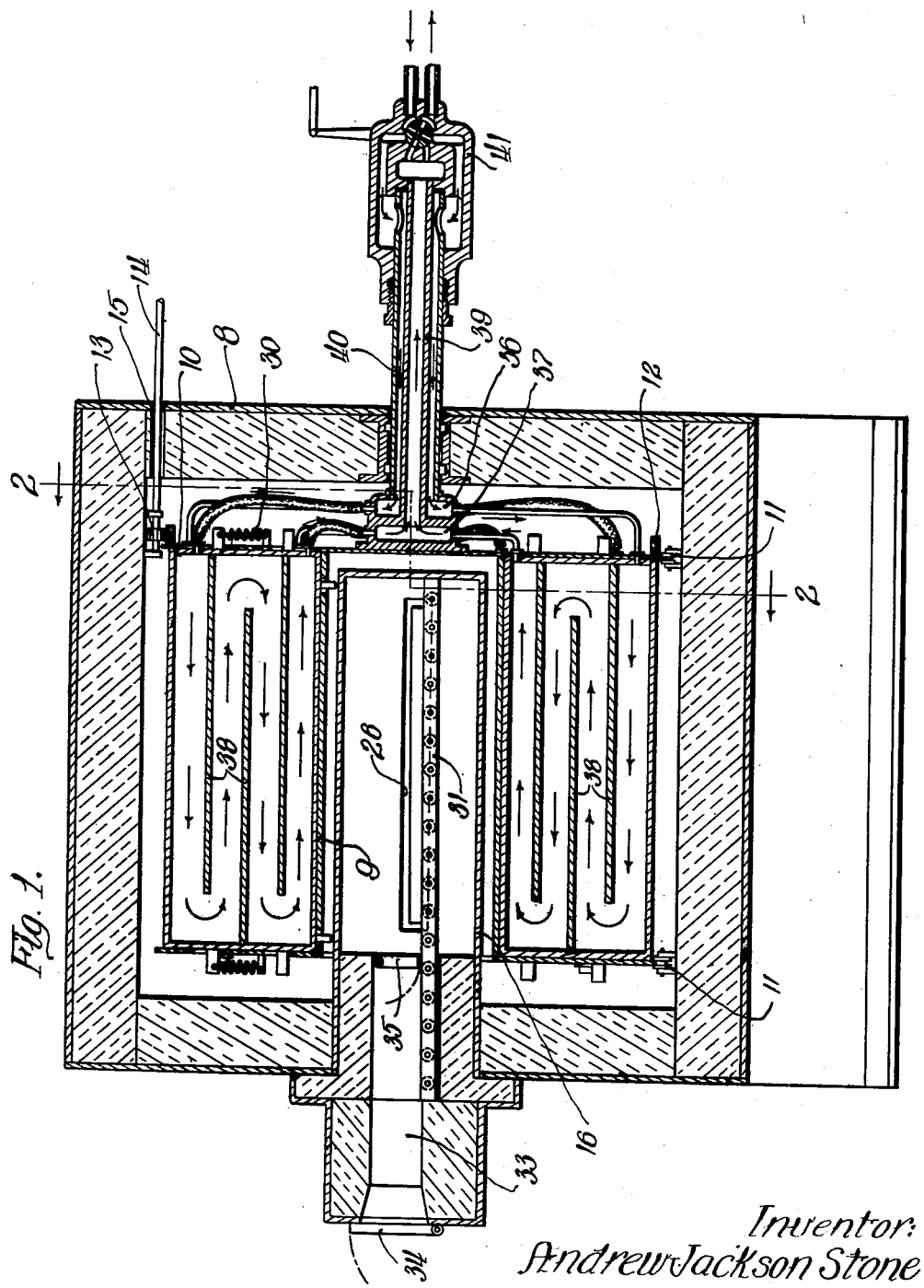
Figure 1 is a vertical axial sectional view of the apparatus of my invention.
Figure 2:
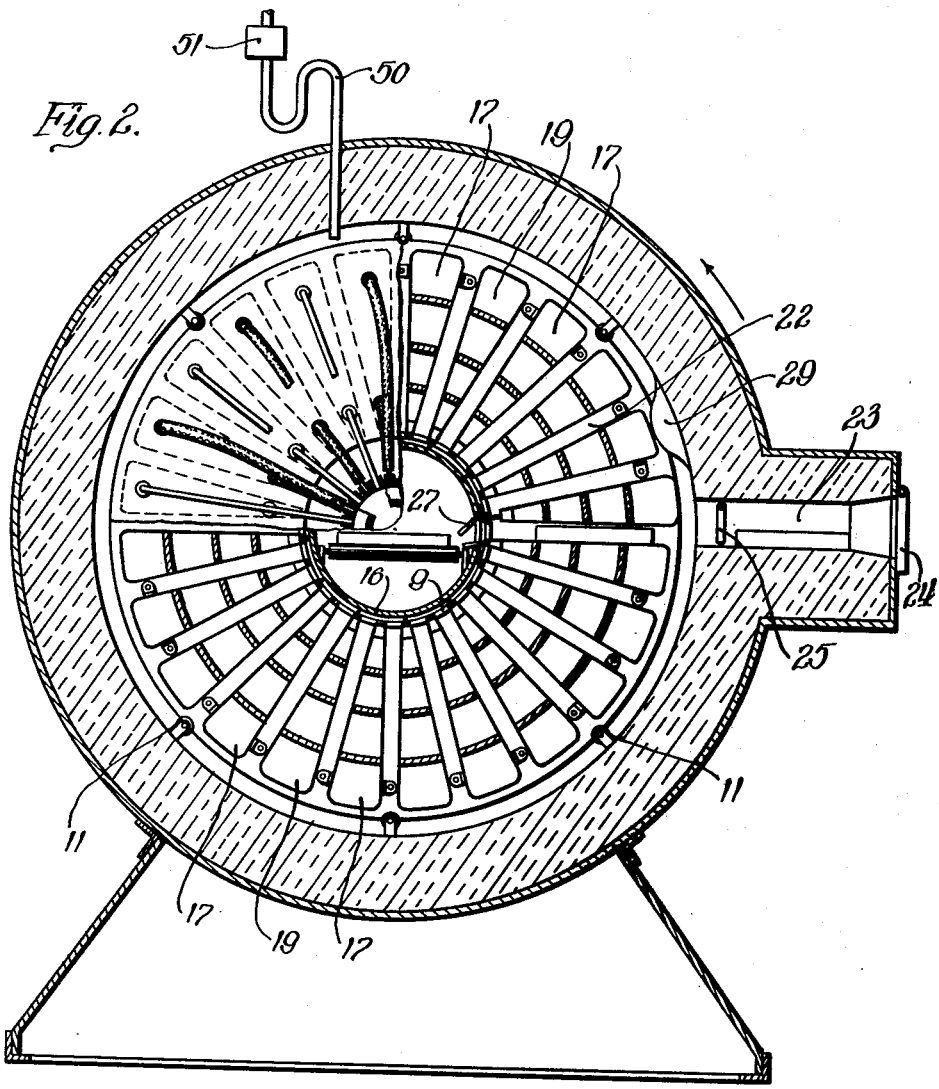
Figure 2 is a cross-sectional view thereof, taken on the plane of the line 2—2 of Figure 1.

Referring first to Figures 1 and 2, it will be seen that the apparatus comprises primarily a thermally insulated housing 8, of generally cylindrical form, and a drum mounted axially within it. This drum comprises the hub 9, the side plates 10, 10 secured thereto, and the refrigerant chambers and appurtenant parts which will be referred to presently. The drum is supported within the housing in grooved rollers 11, 11 and, on one side plate 10, there is provided a circular rack or gear 12 with which meshes a pinion 13 mounted upon a shaft 14 extending out of the housing through a suitable stuffing box 15, this being for the purpose of rotating the drum in its rollers, by suitable means, as by a motor appropriately connected to the shaft 15.

A cylinder 16, closed at its inner end, is mounted in the opposite end wall of the housing 8 and extends coaxially into the hub 9. This cylinder and its purposes will be referred to in detail presently.

A plurality of refrigerant chambers, wedge-shaped in cross section, are mounted radially of the hub 9 between the end plates 10, 10. Alternate refrigerant chambers 17, 17 are fixedly mounted, as by means of cleats 18, shown in Figure 4, which is a perspective view illustrating one of the fixed refrigerant chambers as mounted upon hub 9 and end plate 10. The intervening refrigerant chambers 19, 19 are movable, being mounted, for example, by means of studs 20, 20, on the ends thereof, extending through radial slots 21, 21 in the end plates, as shown in Figure 5, which is a perspective view illustrating one of the movable refrigerant chambers in its relation to hub 9 and end plate 10.

A refrigerant, such as brine at a properly low temperature, is circulated through the chambers 17 and 19, by means and in a manner to be described presently.

The spaces between the refrigerant chambers 17 and 19 form freezing compartments 22. At one side, peripherally of the drum, the housing 8 is provided with an entrance passageway 23 which has a door 24 at its outer end and a door 25 at its inner end, so that a compartment is formed. Through that compartment, the articles to be frozen are introduced into the freezing compartments where they are brought into contact, on both sides, with the cold refrigerant chamber walls.

The refrigerant chambers 19, 19 are made movable so that the freezing compartments may be slightly enlarged at the time they pass the entrance compartment. Since the refrigerant chambers are wedge-shaped in cross section, it follows that when a movable chamber is moved radially outwardly, the space between it and the adjoining fixed refrigerant chamber will be increased and, as will be seen, means is provided for automatically securing this action at the time when articles to be frozen are to be introduced and frozen articles are to be removed. This means is in the form of cams 28, 28 on the cylinder 16 (see Figure 6) and follower pins 29, 29 on the movable refrigerant chambers, these pins passing through openings 30', 30' in the hub 9. The relationship is best shown in Figure 3. As, with the rotation of the drum, a freezer compartment approaches the entrance compartment 23, the movable refrigerant chamber whose wall forms one side thereof, either above or below, is moved outwardly by the engagement of its follower pins with the cams 28, which are of proper length and in proper position for this purpose, thus increasing the depth of the freezer compartment. As the rotation of the drum continues, the refrigerant chamber which has been moved outwardly is restored to its previous position, first by having passed the cams 28, 28, and, second, by the action of cam 29' on the inside of the housing 8 (see Figure 3) or the action of springs 30, 30 (see Figure 1), or both. When these springs are not provided, the movable refrigerant chambers are held in position, wherever moved, by friction; when they are provided they are of sufficient tension to overcome friction and keep the movable refrigerant chambers against the hub 9 or the follower pins 29, 29 against the cams 28, 28.

Coming now to the circulation of the refrigerant through the refrigerant chambers 17 and 19, it will be seen, by referring to Figures 1 and 2, that, mounted axially on one end of the drum are manifolds 36 and 37, one of which is connected by means of short tubes with the inner ends, and the other of which is connected by longer tubes with the other ends, of respective refrigerant chambers, the tubes connecting the manifolds with the movable refrigerant chambers being flexible. Each of the refrigerant chambers is provided with baffles 38, 38 arranged to lengthen the path of flow of the refrigerant therethrough. The manifold 37 is connected by an axial tube 39, and the manifold 36 is connected by a coaxial tube 40, with suitable apparatus, conveniently placed nearby, for receiving the refrigerant from the refrigerant chambers, reducing its temperature to the required point, and returning it.

As a factor in maintaining even temperature of the walls of the refrigerant chambers, I provide means for automatically periodically reversing the flow of the refrigerant, this means being a reversing valve 41. With the valve in the position shown, the flow is as indicated by the arrows in Figure 1, and it is preferably moved back and forth between this position and its reverse position by the same source of power that operates the drum.

Referring now to the means for removing frozen articles from the freezing compartments, it will be seen that the cylinder 16 is provided with an elongated opening 26, aligned with the entrance compartment 23, this opening being provided with a door 27. Frozen articles are moved from the freezing compartments through this opening 26 into the cylinder 16, onto a receiving roller platform 31. From this platform, the frozen articles are removed through the opening 33 in the housing, this opening being provided with doors 34 and 35 to form a compartment.

In order to counteract or prevent the formation of frost in the freezer compartments, which causes the articles to adhere to the compartment walls in the process of freezing, I provide means for the introduction of carbon dioxide into the housing, this being in the form of a tube 50, leading from a source of supply, with a reducing valve, diagrammatically indicated at 51, intervening. The gas displaces moisture laden air and is itself dry so that no moisture is condensed on the refrigerated walls to freeze there. I keep the pressure within the housing slightly in excess of that of the outside atmosphere.

The articles to be frozen are preferably handled in a tray such as shown in Figure 7. This tray comprises a rectangular frame, with suitable handles, and cross wires for a bottom.

The drum is rotated in the direction of the arrow shown in Figure 2, and, as the freezer compartments come successively into position in line with the entrance compartment 23, trays of articles to be frozen are passed into them. In a complete revolution of the drum, all of the freezing compartments can be filled and when the contents of a given compartment have again reached the beginning position, they are frozen and ready to be removed. The timing of the rotation of the drum is such that the period of one revolution is proper for the freezing of the particular articles being treated.

When a tray of frozen articles again reaches the beginning position, shown in Figure 2, the contacting movable refrigerant chamber is moved outwardly, as has been described, to increase the depth of the freezing compartment, and the tray of frozen articles is moved into the central cylinder by the introduction of a new tray of articles to be frozen. Thus trays of articles are constantly being introduced into the freezer compartments and trays of frozen articles are constantly being removed therefrom, all while the freezing process is going on. The drum may be operated slowly and constantly, or step by step.

I claim:

1. In a refrigerating apparatus, a housing, and a rotatable drum mounted in said housing, said drum comprising a plurality of refrigerant chambers with walls substantially parallel to and radiating from the drum axis and spaced to provide freezer compartments therebetween, adjacent chambers being movable relatively to each other to vary the space therebetween.

2. In a refrigerating apparatus, a housing, and a rotatable drum mounted in said housing, said drum comprising a plurality of refrigerant chambers with walls substantially parallel to and radiating from the drum axis and wedge-shaped in cross section in a plane normal to the drum axis, said chambers being spaced to provide freezer compartments therebetween, alternate refrigerant chambers being radially movable to vary the spaces between adjacent refrigerant chambers.

3. In a refrigerating apparatus, a housing, a rotatable drum mounted in said housing, said drum comprising a plurality of refrigerant chambers with walls substantially parallel to and radiating from the drum axis and spaced to provide freezer compartments therebetween, said housing having an opening located to give access to said freezer compartments as rotation of the drum brings them successively into alignment therewith, means for further separating adjacent refrigerant chambers as the space between them arrives at said opening, and means for bringing said adjacent refrigerant chambers back to previous relative position as they leave said opening.

4. In a refrigerating apparatus, a housing, and a rotatable drum mounted in said housing, said drum comprising a plurality of radial refrigerant chambers wedge-shaped in cross-section in a plane normal to the drum axis and spaced to provide parallel walled freezer compartments therebetween, said housing having an opening located to give access to said freezer compartments as rotation of the drum brings them successively into alignment therewith, alternate refrigerant chambers being radially movable to vary the spaces between adjacent refrigerant chambers, a stationary cam located in immediate advance of said opening to be engaged by said movable refrigerant chambers as the drum rotates whereby they are moved outwardly to increase the space between them and the adjacent chamber, and means for restoring said movable refrigerant chambers to previous position upon leaving said opening.

5. In a refrigerating apparatus, a housing, and a rotatable drum mounted in said housing, said drum comprising a plurality of refrigerant chambers with walls substantially parallel to and radiating from the drum axis and spaced to provide freezer compartments, some of said refrigerant chambers being movable to vary the spaces between them and an adjacent refrigerator chamber, means for circulating a refrigerant through said chambers, said means comprising an intake manifold and an outlet manifold with axial connections to the outside and tubes leading from each to said chambers, the tubes connected with said movable chambers being flexible.

6. In a refrigerating apparatus, a housing, a rotatable drum mounted therein, said drum comprising a hub and refrigerant chambers with walls substantially parallel to and radiating from the hub axis and spaced to provide freezer compartments therebetween, some of said chambers being movable, and a stationary cylinder mounted coaxially within said hub, said housing having an opening at the periphery of said drum for access to said freezer compartments, and said cylinder having an opening aligned with said housing opening, and means for moving said movable chambers to increase the space between them and the adjacent chamber, when in alignment with said openings.

7. In a refrigerating apparatus, a housing, a rotatable drum mounted in said housing, said drum comprising a plurality of chambers with walls substantially parallel to and radiating from the drum axis and spaced to provide freezer compartments therebetween, means for circulating a refrigerant through said chamber, and means for reversing the flow of said circulating refrigerant.

8. In a refrigerating apparatus, a housing, a rotatable drum mounted in said housing, said drum comprising a plurality of chambers with walls substantially parallel to and radiating from the drum axis and spaced to provide freezer compartments therebetween, means for circulating a refrigerant through said chambers, means for rotating said drum, and valve means operated by said drum rotation means for periodically reversing the flow of said circulating refrigerant.

9. In a refrigerating apparatus, a housing, a rotatable drum mounted in said housing, said drum comprising a plurality of chambers with walls substantially parallel to and radiating from the drum axis and spaced to provide freezer compartments therebetween, means for circulating a refrigerant through said chambers, baffles in said chambers to lengthen the path of flow therethrough, means for rotating said drum, and valve means operated by said drum rotating means for periodically reversing the flow through said chambers.

10. In a refrigerating apparatus, a thermally insulated housing, and a rotatable drum mounted in said housing, said drum comprising a plurality of refrigerant chambers with walls substantially parallel to and radiating from the drum axis and spaced to provide freezer compartments therebetween, an opening in said housing positioned to give access to said freezer compartments as rotation of the drum brings them successively into alignment therewith, and a door at each end of said opening forming a compartment.

11. In a refrigerating apparatus, a housing, a rotatable drum mounted in said housing, said drum having a hub and refrigerant chambers mounted radially thereof and spaced to provide freezer compartments therebetween, and a stationary cylinder mounted coaxially within said hub, said housing having an opening at the periphery of said drum for access to said freezer compartments, a door for each end of said opening forming a compartment, said cylinder having an opening aligned with said housing opening, and said housing having also an opening at the end of said cylinder, said last-named opening having a door at each end thereof forming a compartment.

12. In a refrigerating apparatus, a thermally insulated housing, refrigerant chambers therein spaced apart to form freezing compartments therebetween, and means for introducing an air-displacing dry gas into said housing and for maintaining the same at a pressure slightly in excess of that of the outside atmosphere, said housing having an opening permitting escape of the moisture laden air displaced by said gas.

13. In a refrigerating apparatus, a thermally insulated housing, refrigerant chambers therein spaced apart to form freezing compartments therebetween, an access compartment leading from the outside to the inside of said housing, a door at each end of said access compartment, and a conduit for the introduction of an air-displacing dry gas into said housing.

14. In the operation of a refrigerating apparatus having freezer compartments, the method of maintaining in said freezer compartments an atmosphere of carbon dioxide at a pressure above the outside atmosphere to displace moisture laden air from said compartments and prevent the formation of frost therein, and permitting escape from said compartments of the moisture laden air displaced by said carbon dioxide.

15. In a refrigerating apparatus, a housing, and a rotatable drum mounted in said housing, said drum comprising a plurality of refrigerating walls substantially parallel to and radiating from the drum axis and spaced to provide freezer compartments therebetween, adjacent walls being movable relatively to each other to vary the space therebetween.

ANDREW JACKSON STONE.